Sept. 14, 1965 J. P. TEXIER 3,205,759
TWO-PIECE MOLDING FASTENER
Filed Aug. 24, 1962 2 Sheets-Sheet 1
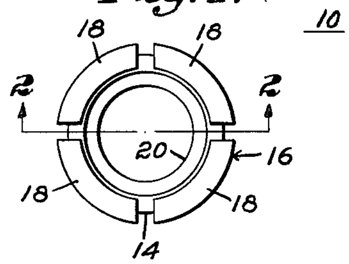
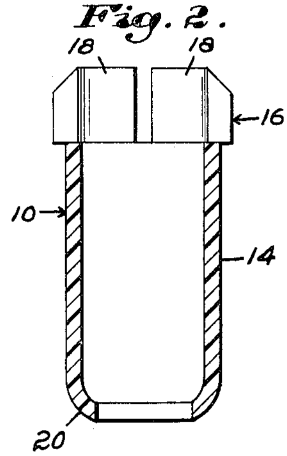
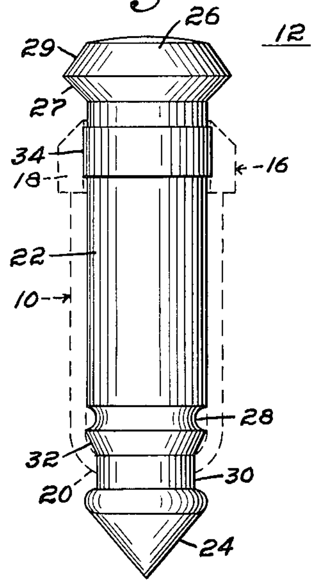
Inventor:
Jean Pierre Texier,
by Gordon Needleman
Atty.

TWO-PIECE MOLDING FASTENER

Filed Aug. 24, 1962 2 Sheets-Sheet 2

Inventor:
Jean Pierre Texier,
by Gordon Needleman
Att'y.

3,205,759
TWO-PIECE MOLDING FASTENER
Jean Pierre Texier, Neuilly-sur-Seine, France, assignor to Gobin Daude, Paris, France, a firm
Filed Aug. 24, 1962, Ser. No. 219,348
Claims priority, application France, Sept. 5, 1961, 872,355, Patent 1,306,686
1 Claim. (Cl. 85—78)

This invention relates generally to fastening devices and more specifically to fastening devices utilizing a pin and sleeve assembly.

An object of the invention is to provide a fastening device having a means of retaining the sleeve on the pin through the use of grooves.

A further object of the invention is to provide a blind fastener utilizing an inturned flange at the end of the sleeve to retain the sleeve in engagement with the pin.

A still further object of the invention is to provide a fastener having a head portion utilized to expand a portion of the sleeve.

Another object of the invention is to provide a fastener which utilizes a part of the object to be held as a means of finally engaging the pin with the sleeve.

Other objects of the invention will, in part, be obvious, and will, in part, appear hereinafter.

FIG. 1 is a top plan view of the sleeve;

FIG. 2 is a section taken on line 2—2 of FIG. 1;

FIG. 3 is a side elevation of the pin showing the sleeve engaged therewith and dotted in;

Figure 4:
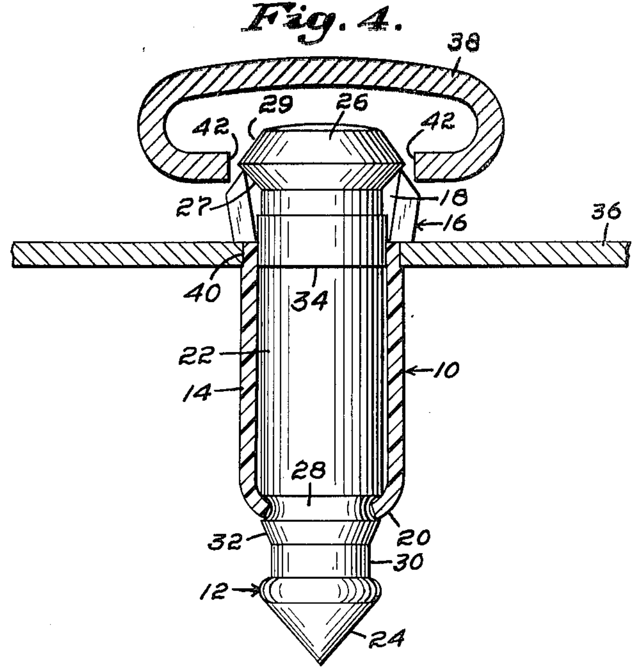
FIG. 4 is a side elevation of the pin engaged with the sleeve and a support, the latter shown in section and also showing a molding or the like in section prior to engagement.
Figure 5:
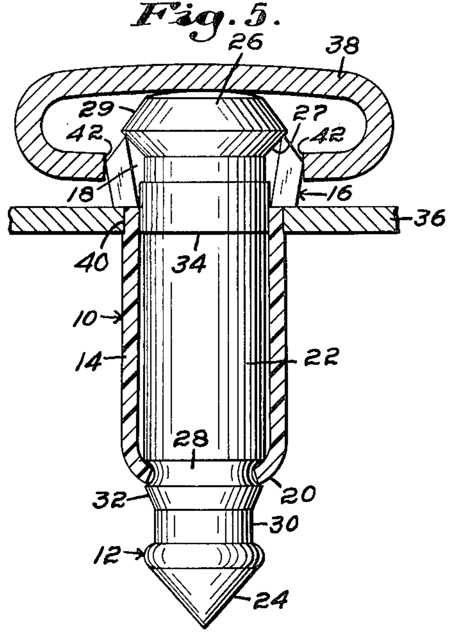
FIG. 5 shows the assembly diclosed in FIG. 4 immediately after engagement of the surface of the molding with the upper surface of the head of the pin.
Figure 6:
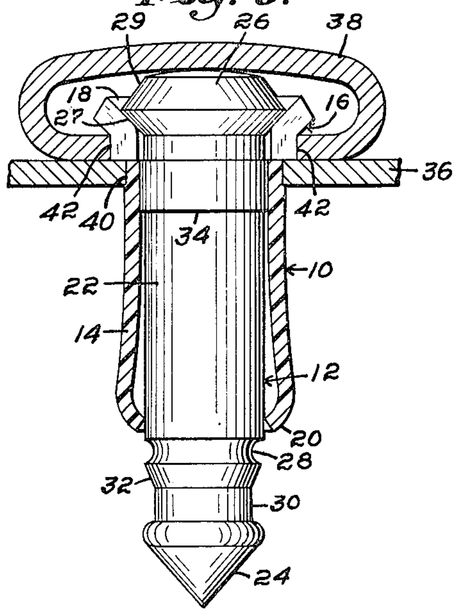
FIG. 6 shows the assembly disclosed in FIG. 4 fully engaged.

Referring to the drawings and especially to FIGS. 1 through 3, there is shown a fastener assembly comprising a sleeve 10 and a pin 12. The sleeve 10 includes a tubular body portion 14 open at both ends and having a tubular collar element 16 integral with one end and having an inside diameter slightly greater than the inside surface of the body portion 14, and an outside diameter greater than the outside diameter of said body portion 14. The collar element 16 is preferably formed of a flexible material such as is found in many types of plastic materials. The applicant has utilized the plastic material "Rilsand." The collar element 16 is divided into a series of spaced teeth 18 which are beveled at the free terminal ends. The free end of the body portion 14 is arced inwardly to form an aperture or opening of less diameter than the remaining integral diameter of the body portion 14. For reference purposes, applicant will refer to this terminal end of the body portion 14 as the limited element 20.

The pin 12 comprises a substantially cylindrical core element 22 having a substantially cone shaped terminal end 24 and a head portion 26 of greater diameter than the remaining portion of the pin 12. Adjacent the cone-shaped terminal end 24 two grooves 28 and 30 are formed circumscribing the core element 22 and separated by a camming element 32. Spaced from the head portion 26 an expander element 34 is formed in integral circumscribed relation to the core element 22 having a purpose to be described hereinafter. The head portion 26 comprises a converging surface 27 and a diverging surface 29 which join at an angle to form a knuckle. The upper surface of the head portion 26 is arced slightly as shown in FIG. 3.

The sleeve 10 and pin 12 may be engaged within a support 36 formed of a material such as metal or the like, and to a molding 38 in the following manner. The pin 12 is engaged to the sleeve 10 by passing the pin 12 through the opening formed by the collar element 16 until the terminal end of the limited element 20 of the sleeve 10 engages within the groove 30 of the pin 12. At this stage, the sleeve 10 is retained on the pin 12 and the assembly may be shipped this way if desired. The support 36 has an inner wall 40 defining an aperture therethrough and the assembly of the sleeve 10 and the pin 12 is engaged to the inner wall 40 by passing the mentioned assembly between the wall 40 until the collar element 16 abuts the upper surface of the support 36 adjacent to the inner wall 40. The external diameter of the body portion 14 is slightly less than the diameter of the aperture formed by the inner wall 40, and the external diameter of the collar element 16 is slightly greater than it. The C-shaped molding 38 having terminal ends 42 is engaged in a manner which places the terminal ends 42 in close proximity to the outer surface of the collar element 16 and which also places the inner upper surface of the molding 38 into superposed abutting relationship with the upper surface of the head portion 26 of the pin 12. As axial pressure is exerted on the molding 38 toward the support 36 the converging surface 27 of the head portion 26 exerts an expanding force on the teeth 18 of the collar 16 assisted by the co-operation of the bevels of the terminal ends of the teeth 18 thereby expanding the teeth 18 away from the axis of the assembly and at the same time bending the terminal ends of the teeth 18 into superposed relationship with the inner surface adjacent the terminal ends 42 of the molding 38. At the same time the limited element 20 of the sleeve 10 is snapped over the camming element 32 into the second groove 28 of the pin 12. As the mentioned axial pressure is continued, the terminal ends of the teeth 18 securely lock the terminal ends 42 of the molding 38 between the teeth 18 and the upper surface of the support 36. Simultaneously, with this action the limited element 20 may be pulled from the groove 28 of the pin 12 ultimately coming to rest along the outer surface of the core element 22 thereby expanding and angling the body portion 14 of the sleeve 10 in relation to the plane of the support 36. This latter action assists in securing the assembly.

While there has been illustrated and described a preferred embodiment of the invention, it should be understood that the invention is best defined by the following claim.

I claim:

A fastener device comprising a pin and a sleeve, said sleeve engaged with and circumscribing the major portion of said pin prior to engagement with a support, said pin having a core element, said core element in the form of a cylinder having a first terminal end and a second terminal end and having a uniform diameter for the major portion of its length, said first terminal end having a head portion integral therewith, and an expander element in integral circumscribed relation with said core element spaced from said head portion and having a diameter greater than said core element and said sleeve including a resilient, tubular body portion having a substantially uniform diameter for the major portion of its length and open at both ends, one of said ends having a smaller internal diameter than the remaining portion of said body portion to form a limiting element and the other end having a collar portion extending therefrom, said collar portion comprising a series of spaced teeth, said head portion including a converging surface and a diverging surface and said expander element distorting said body portion on engagement of the fastener with a support, and said converging surface engaging said teeth thereby forcing them away from the axis of said pin and a pair of grooves formed in circumscribed relation to said core element and in close proximity to said second terminal end, said grooves spaced from each other and each of said grooves adapted to consecutively engage said limiting element of said sleeve.

References Cited by the Examiner

UNITED STATES PATENTS

| | | | |
|---|---|---|---|
| 1,935,202 | 11/33 | Chamberlain et al. | |
| 1,996,128 | 4/35 | Thomson | 85—40 |
| 2,088,955 | 8/37 | Hamill. | |
| 2,555,420 | 6/51 | Richardson | 85—40 |
| 2,774,098 | 12/56 | Tieri | 85—40 |
| 3,042,961 | 7/62 | Tieri | 85—40 |
| 3,053,046 | 9/62 | Fleming | 85—40 |
| 3,063,114 | 11/62 | Perrochat | 24—73 |
| 3,116,528 | 1/64 | Poe | 85—78 |
| 3,147,525 | 9/64 | Texier. | |

FOREIGN PATENTS

| | | |
|---|---|---|
| 1,222,697 | 1/60 | France. |
| 840,563 | 7/60 | Great Britain. |

EDWARD C. ALLEN, *Primary Examiner.*